(12) United States Patent
Holden

(10) Patent No.: US 8,206,132 B2
(45) Date of Patent: Jun. 26, 2012

(54) SLIDE VALVE ACTUATION FOR OVERPRESSURE SAFETY

(75) Inventor: Steven J. Holden, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 745 days.

(21) Appl. No.: 12/294,116

(22) PCT Filed: Jun. 2, 2006

(86) PCT No.: PCT/US2006/021543
§ 371 (c)(1),
(2), (4) Date: Sep. 23, 2008

(87) PCT Pub. No.: WO2007/142627
PCT Pub. Date: Dec. 13, 2007

(65) Prior Publication Data
US 2009/0246062 A1 Oct. 1, 2009

(51) Int. Cl.
*F04B 49/22* (2006.01)

(52) U.S. Cl. .................................. 417/310

(58) Field of Classification Search ........... 417/307–311
See application file for complete search history.

(56) References Cited

U.S. PATENT DOCUMENTS

| 4,249,866 A | 2/1981 | Shaw et al. |
| 5,509,273 A * | 4/1996 | Lakowske et al. ........... 62/228.5 |
| 5,807,081 A | 9/1998 | Schutte et al. |
| 5,979,168 A | 11/1999 | Beekman |
| 6,142,744 A * | 11/2000 | Taylor .............................. 417/53 |
| 6,276,911 B1 | 8/2001 | Krusche et al. |
| 6,302,668 B1 | 10/2001 | Lee |
| 6,739,853 B1 | 5/2004 | Tang et al. |

FOREIGN PATENT DOCUMENTS

WO 2006/085863 A1 8/2006

* cited by examiner

*Primary Examiner* — Toan Ton
*Assistant Examiner* — Andrew Coughlin
(74) *Attorney, Agent, or Firm* — Bachman & LaPointe, P.C.

(57) ABSTRACT

A compressor (20) has an unloading slide valve (100). The valve has a valve element (102) having a range between a first condition and a second condition, the second condition being unloaded relative to the first condition. A piston (124) is in a cylinder (128) and mechanically coupled to the valve element. A control valve (140) is coupled to a headspace (138) of the cylinder to selectively expose the headspace to a flu source (144), pressure of fluid in the headspace producing a force on the piston and valve element in a direction from the second condition toward the first condition. The compressor includes a pressure relief valve coupling (180) in the headspace to suction conditions to unload the compressor responsive to an overpressure.

16 Claims, 5 Drawing Sheets

SLIDE VALVE ACTUATION FOR OVERPRESSURE SAFETY

BACKGROUND OF THE INVENTION

The invention relates to compressors. More particularly, the invention relates to refrigerant compressors.

Screw-type compressors are commonly used in air conditioning and refrigeration applications. In such a compressor, intermeshed male and female lobed rotors or screws are rotated about their axes to pump the working fluid (refrigerant) from a low pressure inlet end to a high pressure outlet end. During rotation, sequential lobes of the male rotor serve as pistons driving refrigerant downstream and compressing it within the space between an adjacent pair of female rotor lobes and the housing. Likewise sequential lobes of the female rotor produce compression of refrigerant within a space between an adjacent pair of male rotor lobes and the housing. The interlobe spaces of the male and female rotors in which compression occurs form compression pockets (alternatively described as male and female portions of a common compression pocket joined at a mesh zone). In one implementation, the male rotor is coaxial with an electric driving motor and is supported by bearings on inlet and outlet sides of its lobed working portion. There may be multiple female rotors engaged to a given male rotor or vice versa.

When one of the interlobe spaces is exposed to an inlet port, the refrigerant enters the space essentially at suction pressure. As the rotors continue to rotate, at some point during the rotation the space is no longer in communication with the inlet port and the flow of refrigerant to the space is cut off. After the inlet port is closed, the refrigerant is compressed as the rotors continue to rotate. At some point during the rotation, each space intersects the associated outlet port and the closed compression process terminates. The inlet port and the outlet port may each be radial, axial, or a hybrid combination of an axial port and a radial port.

It is often desirable to temporarily reduce the refrigerant mass flow through the compressor by delaying the closing off of the inlet port (with or without a reduction in the compressor volume index) when full capacity operation is not required. Such unloading is often provided by a slide valve having a valve element with one or more portions whose positions (as the valve is translated) control the respective suction side closing and discharge side opening of the compression pockets. The primary effect of an unloading shift of the slide valve is to reduce the initial trapped suction volume (and hence compressor capacity); a reduction in volume index is a typical side effect. Exemplary slide valves are disclosed in U.S. Patent Application Publication No. 20040109782 A1 and U.S. Pat. Nos. 4,249,866 and 6,302,668.

If, for example, there is a restriction downstream of the discharge plenum, the discharge pressure may become excessive, potentially damaging the compressor. Accordingly, compressors may include a pressure relief valve. An exemplary relief valve is positioned in a passageway between the discharge plenum and the suction plenum and vent gas from the discharge plenum to the suction plenum when the pressure difference across the valve exceeds a threshold pressure. U.S. Pat. No. 5,807,081 discloses a bidirectional pressure relief valve. That also addresses flow reversal conditions.

Additionally, international application PCT/US05/03813, filed Feb. 7, 2005 discloses a pressure relief valve protecting the slide valve piston rings.

SUMMARY OF THE INVENTION

According to one aspect of the invention, a compressor has an unloading slide valve. The valve has a valve element having a range between a first condition and a second condition, the second condition being unloaded relative to the first condition. A piston is in a cylinder and mechanically coupled to the valve element. A control valve is coupled to a headspace of the cylinder to selectively expose the headspace to a fluid source, pressure of fluid in the headspace producing a force on the piston and valve element in a direction from the second condition toward the first condition. A pressure relief valve couples the headspace to suction conditions to unload the compressor responsive to an overpressure.

In various implementations, the pressure relief valve may be in addition to another pressure relief valve (e.g., an internal valve) extending between discharge and suction conditions. The pressure relief valve may be provided in a remanufacturing of a compressor or the reengineering of a compressor configuration from an initial baseline configuration.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
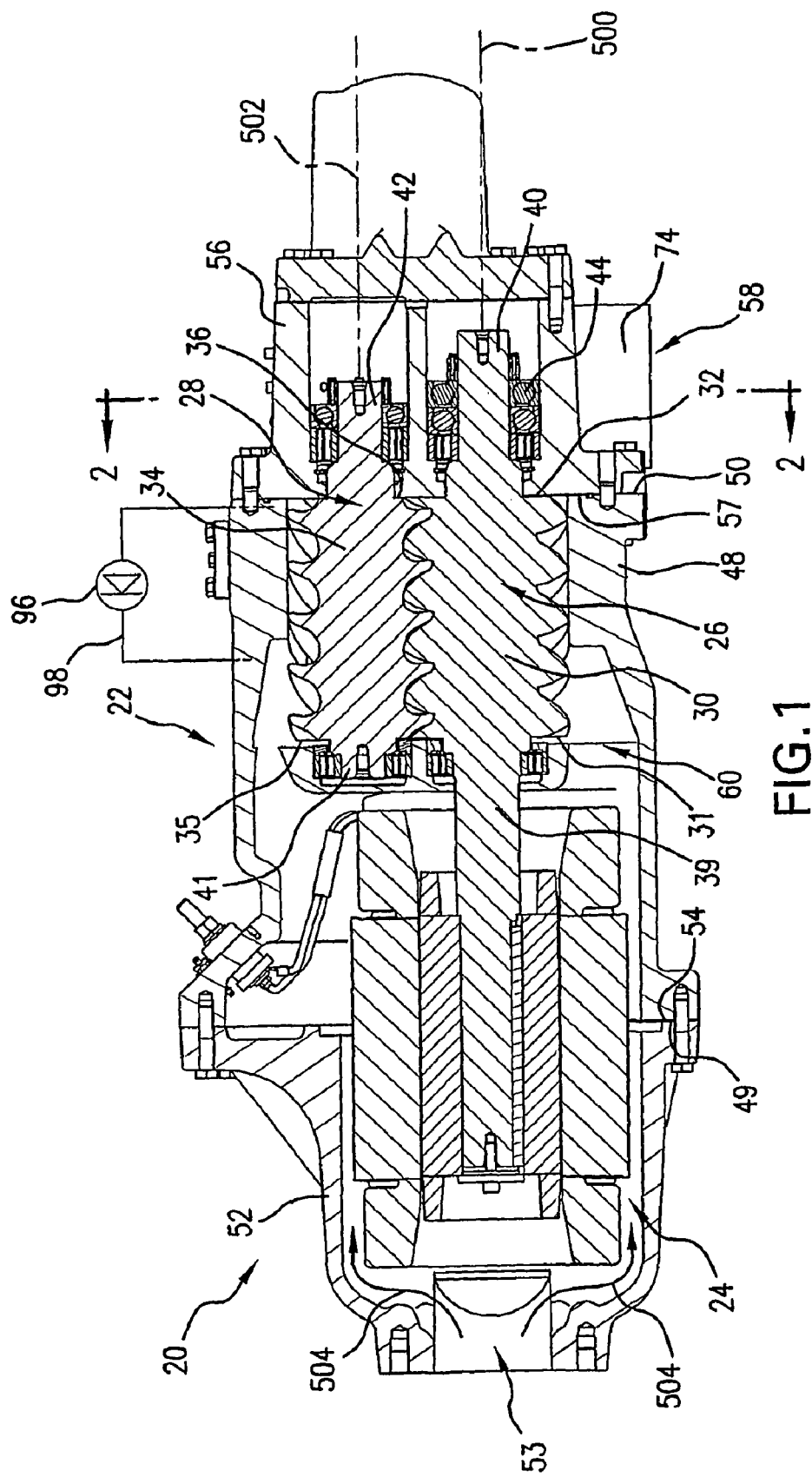
FIG. 1 is a longitudinal sectional view of a compressor.

FIG. 1 shows a compressor 20 having a housing assembly 22 containing a motor 24 driving rotors 26 and 28 having respective central longitudinal axes 500 and 502. For purposes of illustration, the basic structure of the compressor is taken from PCT/US05/03813, noted above. However, other existing or yet-developed compressor configurations are possible.

In the exemplary embodiment, the rotor 26 has a male lobed body or working portion 30 extending between a first end 31 and a second end 32. The working portion 30 is enmeshed with a female lobed body or working portion 34 of the female rotor 28. The working portion 34 has a first end 35 and a second end 36. Each rotor includes shaft portions (e.g., stubs 39, 40, 41, and 42 unitarily formed with the associated working portion) extending from the first and second ends of the associated working portion. Each of these shaft stubs is mounted to the housing by one or more bearing assemblies 44 for rotation about the associated rotor axis.

In the exemplary embodiment, the motor is an electric motor having a rotor and a stator. One of the shaft stubs of one of the rotors 26 and 28 may be coupled to the motor's rotor so as to permit the motor to drive that rotor about its axis. When so driven in an operative first direction about the axis, the rotor drives the other rotor in an opposite second direction. The exemplary housing assembly 22 includes a rotor housing 48 having an upstream/inlet end face 49 approximately midway along the motor length and a downstream/discharge end face 50 essentially coplanar with the rotor body ends 32 and 36. Many other configurations are possible.

The exemplary housing assembly 22 further comprises a motor/inlet housing 52 having a compressor inlet/suction port 53 at an upstream end and having a downstream face 54 mounted to the rotor housing downstream face (e.g., by bolts through both housing pieces). The assembly 22 further includes an outlet/discharge housing 56 having an upstream face 57 mounted to the rotor housing downstream face and having an outlet/discharge port 58. The exemplary rotor housing, motor/inlet housing, and outlet housing 56 may each be formed as castings subject to further finish machining.

Figure 2:
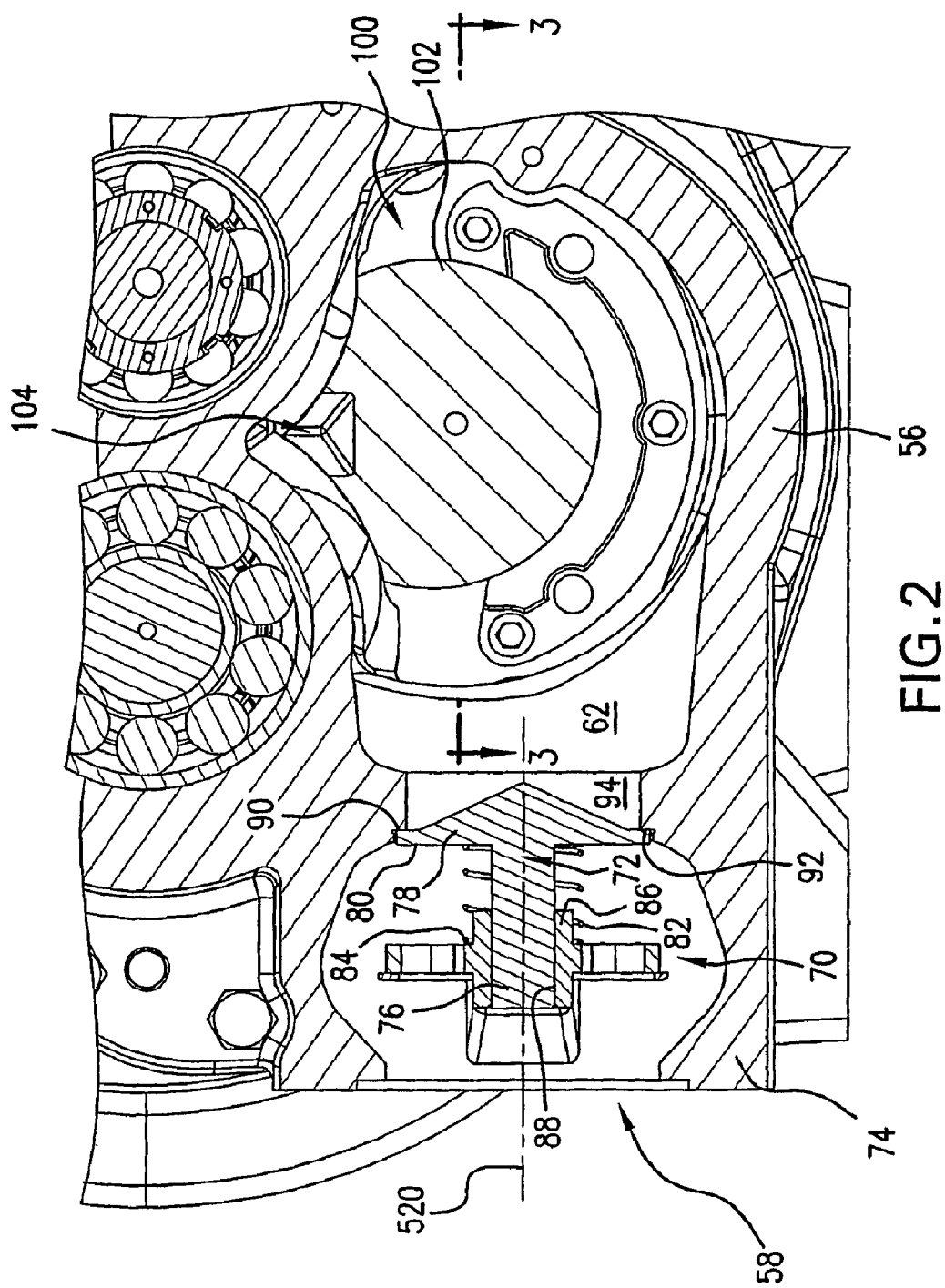
FIG. 2 is a transverse sectional view of a discharge plenum of the compressor of FIG. 1, taken along line 2-2.

Surfaces of the housing assembly 22 combine with the enmeshed rotor bodies 30 and 34 to define inlet and outlet ports to compression pockets compressing and driving a refrigerant flow 504 from a suction (inlet) plenum 60 to a discharge (outlet) plenum 62 (FIG. 2). A series of pairs of male and female compression pockets are formed by the housing assembly 22, male rotor body 30 and female rotor body 34. Each compression pocket is bounded by external surfaces of enmeshed rotors, by portions of cylindrical surfaces of male and female rotor bore surfaces in the rotor case and continuations thereof along a slide valve, and portions of face 57.

FIG. 2 shows further details of the exemplary flowpath at the outlet/discharge port 58. A check valve 70 is provided having a valve element 72 mounted within a boss portion 74 of the outlet housing 56. The exemplary valve element 72 is a front sealing poppet having a stem/shaft 76 unitarily formed with and extending downstream from a head 78 along a valve axis 520. The head has a back/underside surface 80 engaging an upstream end of a compression bias spring 82 (e.g., a metallic coil). The downstream end of the spring engages an upstream-facing shoulder 84 of a bushing/guide 86. The bushing/guide 86 may be unitarily formed with or mounted relative to the housing and has a central bore 88 slidingly accommodating the stem for reciprocal movement between an open condition (not shown) and a closed condition of FIG. 2. The spring 82 biases the element 72 upstream toward the upstream position of the closed condition. In the closed condition, an annular peripheral seating portion 90 of the head upstream surface seats against an annular seat 92 at a downstream end of a port 94 from the discharge plenum.

A pressure relief valve 96 (FIG. 1) is positioned along a passageway 98 between the suction plenum and discharge plenum. Although shown schematically, the actual passageway 98 may be a bore through the rotor case. An exemplary relief valve opens when the discharge pressure exceeds the suction pressure by an exemplary threshold of about 400 psi (dependent upon design operational parameters and housing strength).

For capacity control/unloading, the compressor has a slide valve 100 having a valve element 102. The valve element 102 has a portion 104 along the mesh zone between the rotors (i.e., along the high pressure cusp). The exemplary valve element has a first portion 106 (FIG. 3) at the discharge plenum and a second portion 108 at the suction plenum. The valve element is shiftable to control compressor capacity to provide unloading. The exemplary valve is shifted via linear translation parallel to the rotor axes.

Figure 3:
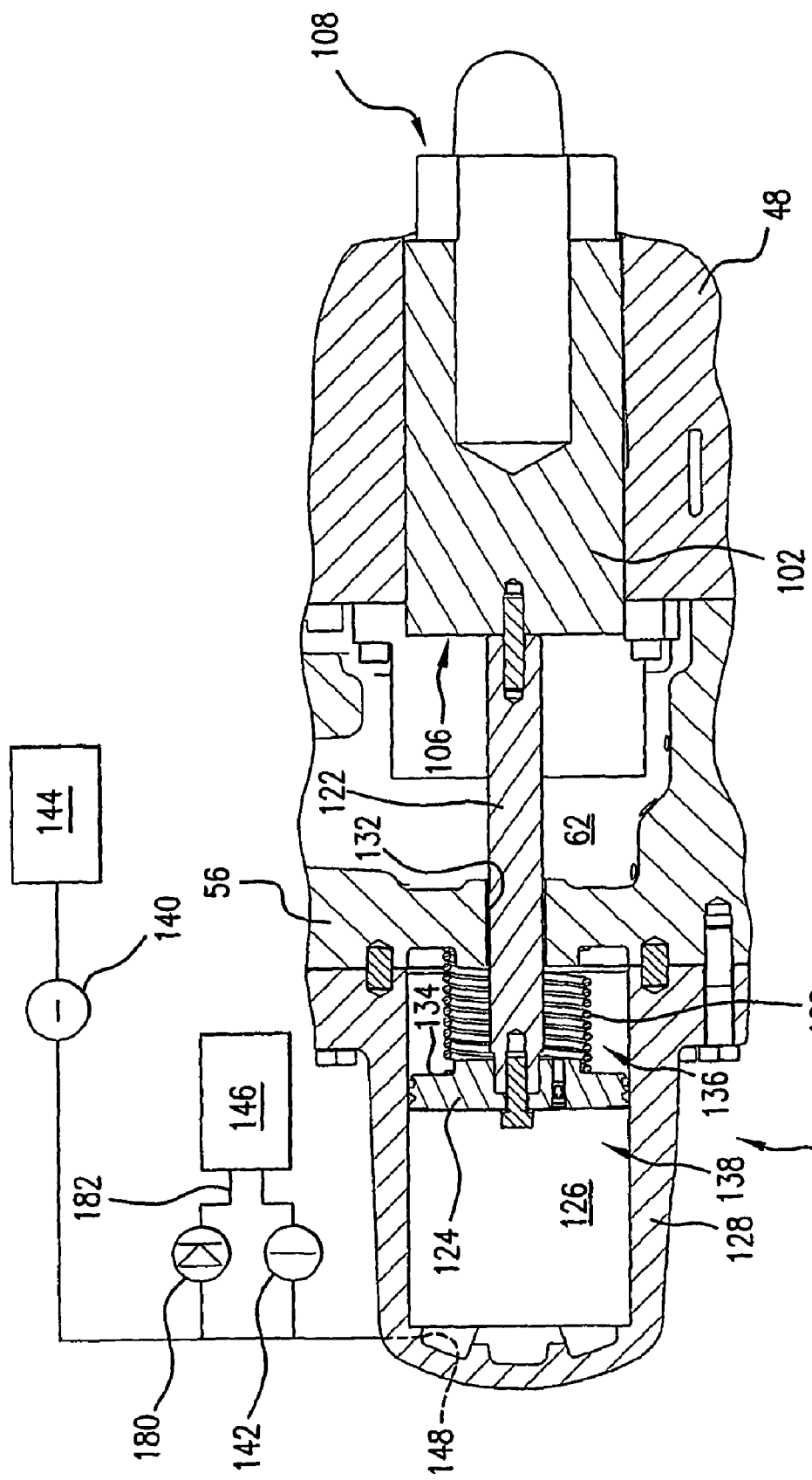
FIG. 3 is a sectional view of a slide valve assembly of the discharge plenum of FIG. 2 in a fully loaded condition, taken along line 3-3.
Figure 4:
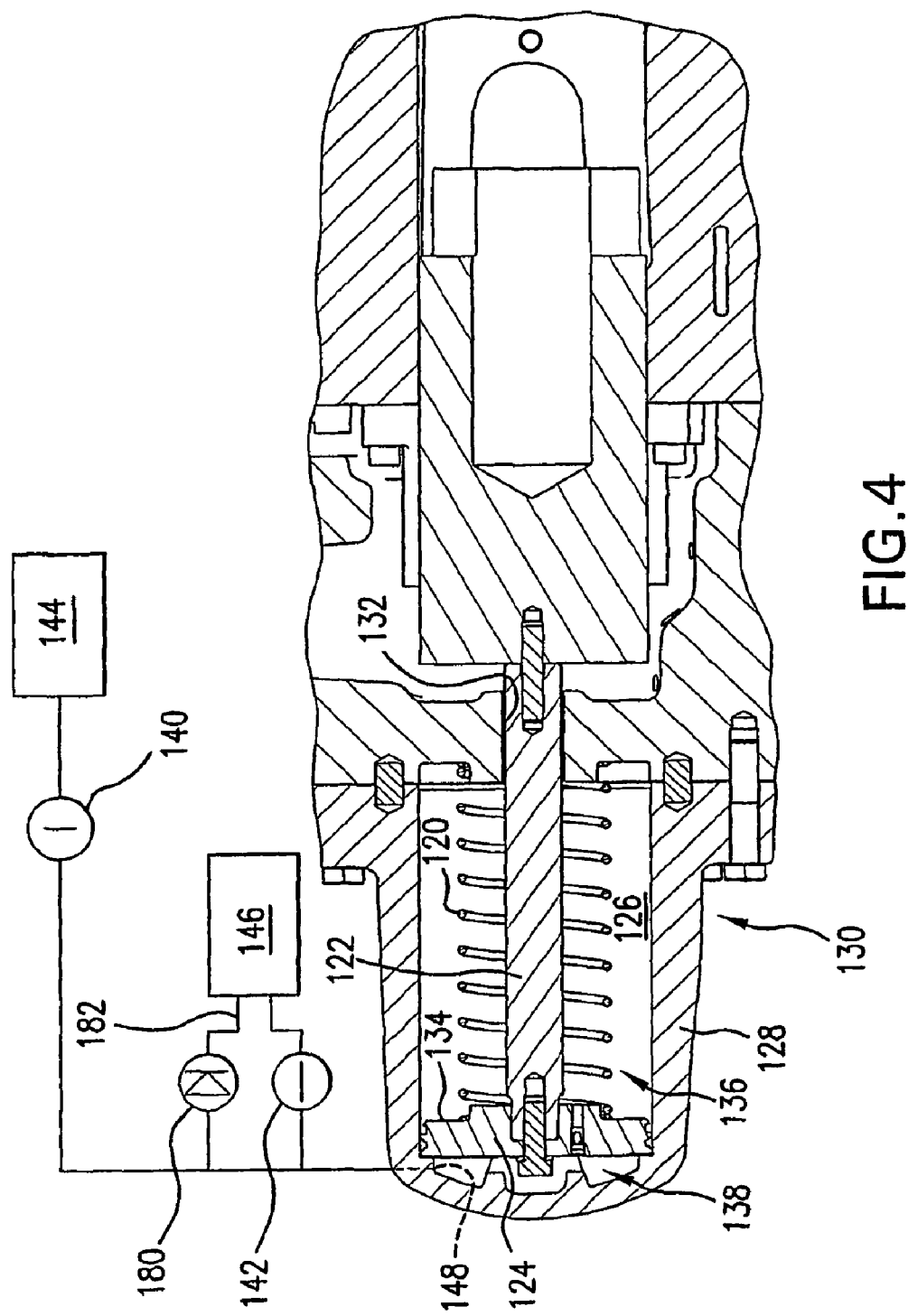
FIG. 4 is a view of the slide valve of FIG. 3 in a relatively unloaded condition.

FIG. 3 shows the valve element at an upstream-most position in its range of motion In this position, the compression pockets close relatively upstream and capacity is a relative maximum (e.g., at least 90% of a maximum displacement volume for the rotors, and often about 99%). FIG. 4 shows the valve element shifted to a downstream-most position. Capacity is reduced in this unloaded condition (e.g., to a displacement volume less than 40% of the FIG. 3 displacement volume or the maximum displacement volume, and often less than 30%). In the exemplary slide valve, shifts between the two positions are driven by a combination of spring force and fluid pressure. A main spring 120 biases the valve element from the loaded to the unloaded positions. In the exemplary valve, the spring 120 is a metal coil spring surrounding a shaft 122 coupling the valve element to a piston 124. The piston is mounted within a bore (interior) 126 of a cylinder 128 formed in a slide case element 130 attached to the outlet case. The shaft passes through an aperture 132 in the outlet case. The spring is compressed between an underside 134 of the piston and the outlet case. A proximal portion 136 of the cylinder interior is in pressure-balancing fluid communication with the discharge plenum via clearance between the aperture and shaft. A headspace 138 is selectively coupled via electronically-controlled solenoid valves 140 and 142 (shown schematically) to a high pressure fluid source 144 at or near discharge conditions (e.g., a high pressure oil separator) and a drain/sink 146 at or near suction conditions. The drain/sink 146 may be the suction plenum 60 or may otherwise be substantially at suction conditions. A port 148 is schematically shown in the cylinder at the headspace at the end of a conduit network connecting the valves 140 and 142, source 144, and drain/sink, 146. In an exemplary implementation, the portions of the conduit network may be formed within the castings of the housing components.

The loaded position/condition of FIG. 3 can be achieved by coupling the headspace 138 to the source 144 and isolating it from the drain/sink 146 by appropriate control of valves 140 and 142. The unloaded position/condition of FIG. 4 can be achieved by coupling the headspace 138 to the drain/sink 146 and isolating it from source 144 by appropriate control of valves 140 and 142. Intermediate (partly loaded) positions, not shown, can be achieved by alternating connection of headspace 138 to either the source 144 or the drain/sink 146 using appropriately chosen spans of time for connection to each, possibly in combination with isolating the headspace 138 from both source 144 and drain/sink 146 for an appropriately chosen span of time (e.g., via appropriate modulation techniques).

Figure 5:
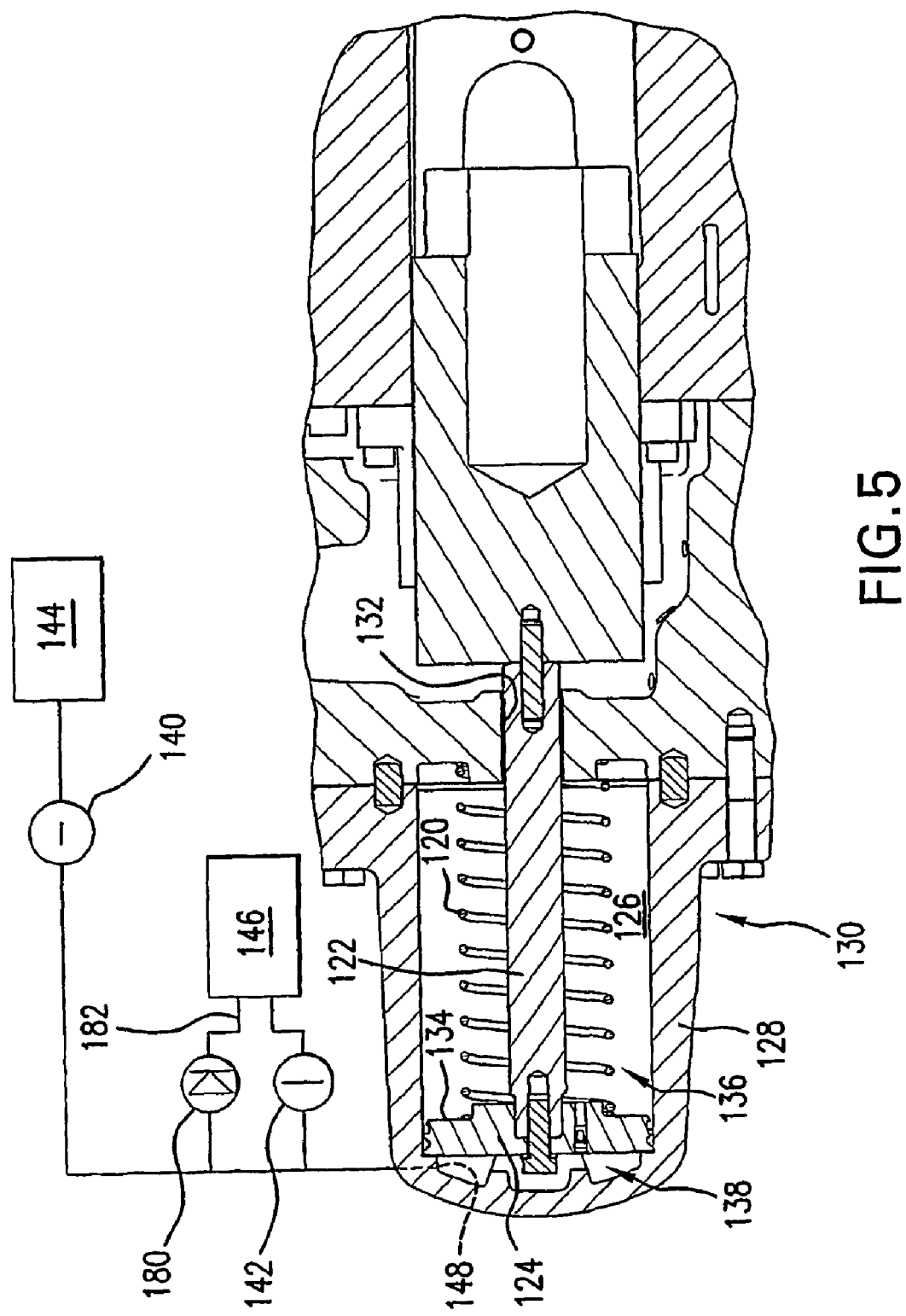
FIG. 5 is a view of the slide valve of FIG. 3 after a pressure relief unloading.

As so far described, the compressor may be of a variety of existing configurations. FIGS. 3-5 show a second pressure relief valve 180 in a passageway 182 extending between the headspace 138 and the suction plenum 60.

The exemplary valve 180 is a one-way spring-loaded pressure relief valve having a predetermined threshold/relief or pop-off pressure. The exemplary valve 180 is normally closed, when the pressure in the headspace exceeds that in the suction plenum 60 by the threshold pressure, this pressure difference will shift the relief valve element against its spring force to automatically open the valve 180 and permit the fluid (e.g., the oil in the particular example) to pass from the headspace to the suction plenum 60 to shift the slide valve element 102 to the unloaded condition.

When an overpressure condition occurs, the increased pressure of refrigerant in the discharge plenum 62 and cylinder bore proximal portion 136 will increase the fluid pressure against the piston 124 toward the unloaded condition of FIG. 4. Given the relative incompressibility of the oil in the headspace 138, the pressure in the headspace 138 may increase correspondingly even with little piston movement. If the difference between the headspace pressure and the suction pressure (e.g., at the sink 146) exceeds the threshold of the pressure relief valve 180, the pressure relief valve 180 will open, passing fluid from the headspace 138 to the sink 146 and allowing the slide valve element 102 to shift. The shift may typically be essentially all the way to the unloaded condition (FIG. 5). The shift unloads the compressor and reduces the further contribution of the compressor to the overpressure condition.

The pressure relief valve 180 may open in a number of situations. One example involves a partial blockage of the refrigerant circuit along which the compressor is located. This may occur during compressor operation (e.g., even while operating at a steady-state) or at start-up. The imposition or development of a restriction during otherwise steady-state operation will increase discharge pressure. A sufficient restriction will cause the discharge pressure to increase above the threshold of the pressure relief valve 180. The unloading then caused by the opening of the pressure relief valve 180 may be effective to address a partial restriction in the absence of opening of the pressure relief valve 96. In other situations, the unloading may supplement or complement operation of the pressure relief valve 96. If, despite the unloading, the discharge pressure rises to exceed the threshold pressure of the pressure relief valve 96, the pressure relief valve 96 will then open and divert compressed refrigerant from the discharge plenum back 62 to the suction plenum 60. Because of the unloading, however, the pressure relief valve 96 will not have to pass as great a refrigerant flow as it would in the absence of the unloading.

Other examples involve start-up operation. An exemplary start-up restriction may be in the form of an erroneously closed service valve.

As is discussed further below, the pressure relief valve 180 advantageously opens before the pressure relief valve 96 does. If the impact of the spring 120 (if any) is negligible, the pressure will be essentially equal across the piston 124. Thus, the threshold pressure of the pressure relief valve 180 may, advantageously, be slightly less than the threshold pressure of the pressure relief valve 96.

Depending upon the implementation, one possible advantage of the pressure relief valve 180 is that it increases flexibility in choice of the pressure relief valve 96. For example, as noted above, the pressure relief valve 96 and its associated passageway 98 would not need to be as large as they would be in the absence of the pressure relief valve 180. Thus, when engineering a relatively high capacity compressor, an existing pressure relief valve 96 from a lower capacity compressor could be used. This represents a cost savings.

Because the pressure relief valve 96 typically passes gas whereas the pressure relief valve 180 typically passes liquid oil (more dense), the pressure relief valve 180 may be small relative to the pressure relief valve 96. Additionally, the cost savings involved in the size decrease of the pressure relief valve 96 may outweigh the costs of providing the pressure relief valve 180.

Other advantages may relate to avoiding deleterious effects on the pressure relief valve 96. For example, by unloading at a pressure slightly below the threshold pressure of the pressure relief valve 96, wear is saved. This may reduce the tendency for residual leaks to develop in the pressure relief valve 96.

In a re-engineering situation, when one adds the second pressure relief valve 180, one might one also change other aspects of the compressor. As noted above, one might reduce the size (flow capacity) of the pressure relief valve 96. An engineering or re-engineering may be an iterative process performed using actual hardware and/or calculation/simulation. For examples, parameters of the pressure relief valve 180 (e.g., the threshold/relief pressure and/or the capacity) may be optimized to provide reliable unloading at as high a pressure as possible without triggering the pressure relief valve 96.

One or more embodiments of the present invention have been described. Nevertheless, it will be understood that various modifications may be made without departing from the spirit and scope of the invention. For example, in a reengineering or remanufacturing situation, details of the existing compressor configuration may particularly influence or dictate details of the implementation. Additional pressure relief features such as those disclosed in PCT/US05/03813, may also be provided. Accordingly, other embodiments are within the scope of the following claims.

What is claimed is:

1. A compressor apparatus (20) comprising:
   a housing (22) having first (53) and second (58) ports along a flow path;
   one or more working elements (26; 28) cooperating with the housing (22) to define a compression path between suction (60) and discharge (62) locations along the flow path;
   a pressure relief valve (96) coupling the suction (60) and discharge (62) locations to relieve an overpressure in the discharge location (62) by passing working fluid from the discharge location (62) to the suction location (60); and
   an unloading slide valve (100) having:
      a valve element (102) having a range between a first condition and a second condition, the second condition being unloaded relative to the first condition;
      a cylinder (128);
      a piston (124) in the cylinder and mechanically coupled to the valve element;
      a control valve (140) coupled to a headspace (138) of the cylinder to selectively expose the headspace to an oil source (144), pressure of oil in the headspace producing a force on the piston and valve element in a direction from the second condition toward the first condition; and
      means (180, 182) for relieving excess pressure in the headspace by passing oil from the headspace to a low pressure location, wherein the means is in parallel with an electronically-controlled valve.

2. The apparatus of claim 1 wherein:
   the range is a range of linear translation; and
   the means comprises a second pressure relief valve (180).

3. The apparatus of claim 2 wherein the second pressure relief valve (180) is a spring-loaded one-way valve.

4. The apparatus of claim 2 wherein:
   the second pressure relief valve (180) is in parallel with said electronically-controlled valve (142).

5. The apparatus of claim 1 wherein:
   the pressure relief valve (96) has a first threshold/relief pressure; and
   the means (180) has a second threshold/relief pressure less than the first threshold/relief pressure.

6. The compressor of claim 1 wherein the one or more working elements include:
   a male-lobed rotor (26) having a first rotational axis (500); and
   a female-lobed rotor (28) having a second rotational axis (502) and enmeshed with the male-lobed rotor.

7. The apparatus of claim 1 wherein:
   the oil source (144) is an oil separator.

8. A method for remanufacturing a compressor (20) or reengineering a configuration of the compressor comprising:

providing an initial such compressor or configuration having:
- a housing (22);
- one or more working elements (26; 28) cooperating with the housing to define a compression path between suction (60) and discharge (62) locations; and
- an unloading slide valve (100) having:
  - a valve element (102) having a range between a first condition and a second condition, the second condition being unloaded relative to the first condition;
  - a cylinder (128);
  - a piston (124) in the cylinder and mechanically coupled to the valve element; and
  - an oil in a headspace (138) of the cylinder, pressure of the oil in the headspace producing a force on the piston and valve element in a direction from the second condition toward the first condition; and adapting such compressor or configuration to include:
- a passageway (182) coupling the headspace to a low pressure location (146); and
- a pressure relief valve along the passageway, wherein the initial compressor or configuration has an electronically-controlled valve between the headspace and the suction location; and the adapting places the pressure relief valve in parallel with the electronically-controlled valve.

9. The method of claim 8 wherein:
the adapting includes selecting at least one parameter of the pressure relief valve (180).

10. The method of claim 9 wherein the selecting comprises an iterative:
- varying of said at least one parameter; and
- determining a relationship between the unloading and the triggering of a pressure relief valve (96) between suction (60) and discharge (62) locations.

11. The method of claim 10 wherein:
the varying comprises varying a threshold/relief pressure.

12. The method of claim 8 wherein:
the electronically-actuated valve (142) is a solenoid valve.

13. A compressor apparatus comprising:
- a housing (22) having first (53) and second (58) ports along a flow path;
- one or more working elements (26; 28) cooperating with the housing (22) to define a compression path between suction (60) and discharge (62) locations along the flow path; and
- an unloading slide valve (100) having:
  - a valve element (102) having a range between a first condition and a second condition, the second condition being unloaded relative to the first condition;
  - a cylinder (128);
  - a piston (124) in the cylinder and mechanically coupled to the valve element;
  - a control valve (140) coupled to a headspace (138) of the cylinder to selectively expose the headspace to an oil source (144), pressure of oil in the headspace producing a force on the piston and valve element in a direction from the second condition toward the first condition;
  - a passageway (182) coupling the headspace to a low pressure location (146); and
  - a pressure relief valve along the passageway, wherein the pressure relief valve is in parallel with an electronically-controlled valve.

14. The apparatus of claim 13 wherein:
the pressure relief valve (180) is a spring-loaded one-way valve.

15. The apparatus of claim 13 wherein:
a second pressure relief valve (96) couples the suction (60) and discharge (62) locations to relieve an overpressure in the discharge location (62) by passing working fluid from the discharge location (62) to the suction location (60).

16. The apparatus of claim 13 wherein:
the pressure relief valve (180) is coupled to a drain/sink (146).

* * * * *